(12) United States Patent
Eitan et al.

(10) Patent No.: US 10,411,776 B2
(45) Date of Patent: Sep. 10, 2019

(54) BEAMFORMING TRAINING USING MULTIPLE-INPUT AND MULTIPLE-OUTPUT TRANSMISSION SCHEME

(71) Applicant: QUALCOMM Incorporated, San Diego, CA (US)

(72) Inventors: Alecsander Petru Eitan, Haifa (IL); Amichai Sanderovich, Atlit (IL); Gal Basson, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/379,184

(22) Filed: Dec. 14, 2016

(65) Prior Publication Data

US 2017/0207839 A1 Jul. 20, 2017

Related U.S. Application Data

(60) Provisional application No. 62/278,653, filed on Jan. 14, 2016.

(51) Int. Cl.
| | |
|---|---|
| *H04M 1/00* | (2006.01) |
| *H04B 7/06* | (2006.01) |
| *H04B 7/0417* | (2017.01) |
| *H04B 7/0452* | (2017.01) |
| *H04L 29/06* | (2006.01) |
| *H04W 72/14* | (2009.01) |
| *H04W 4/00* | (2018.01) |

(52) U.S. Cl.
CPC ......... *H04B 7/0617* (2013.01); *H04B 7/0421* (2013.01); *H04B 7/0452* (2013.01); *H04B 7/0619* (2013.01); *H04B 7/0695* (2013.01); *H04L 69/22* (2013.01); *H04W 72/14* (2013.01)

(58) Field of Classification Search
CPC ..... H04W 40/06; H04W 16/28; H04W 52/42; H04W 72/046; H04B 7/024; H04B 7/0413; H04B 7/0452; H04B 7/0495; H04B 7/0617; H04L 1/06
See application file for complete search history.

(56) References Cited

U.S. PATENT DOCUMENTS

| | | | |
|---|---|---|---|
| 8,576,804 B2 * | 11/2013 | Kim | H04B 7/0617 370/249 |
| 9,960,877 B2 * | 5/2018 | Cordeiro | H04J 13/0014 |
| 2006/0270343 A1 * | 11/2006 | Cha | 455/25 |

(Continued)

OTHER PUBLICATIONS

International Search Report and Written Opinion—PCT/US2016/066947—ISA/EPO—dated Mar. 8, 2017.

*Primary Examiner* — San Htun
(74) *Attorney, Agent, or Firm* — Patterson & Sheridan, L.L.P.

(57) ABSTRACT

Certain aspects of the present disclosure relate to beamforming training using a multiple-input and multiple-output (MIMO) transmission scheme. Certain aspects of the present disclosure provide an apparatus that generally includes a processing system configured to generate a frame associated with beamforming training, the frame comprising an indication of whether the beamforming training is to be performed using a multiple-input and multiple-output (MIMO) transmission scheme. The apparatus may also include an interface configured to output the frame for transmission.

20 Claims, 13 Drawing Sheets

(56) References Cited

U.S. PATENT DOCUMENTS

| | | | |
|---|---|---|---|
| 2012/0281620 A1* | 11/2012 | Sampath | H04B 7/0643 370/328 |
| 2013/0177115 A1* | 7/2013 | Yang | H04B 7/01 375/347 |
| 2013/0301454 A1* | 11/2013 | Seol | H04B 7/043 370/252 |
| 2015/0244432 A1* | 8/2015 | Wang | H04B 7/0695 375/267 |
| 2015/0289147 A1* | 10/2015 | Lou | H04B 7/0408 370/329 |
| 2015/0333894 A1 | 11/2015 | Wang et al. | |
| 2016/0119043 A1* | 4/2016 | Rajagopal | H04B 7/063 370/329 |
| 2016/0285522 A1* | 9/2016 | Kasher | H04B 7/043 |
| 2016/0329947 A1* | 11/2016 | Jo | H04B 7/0634 |

* cited by examiner

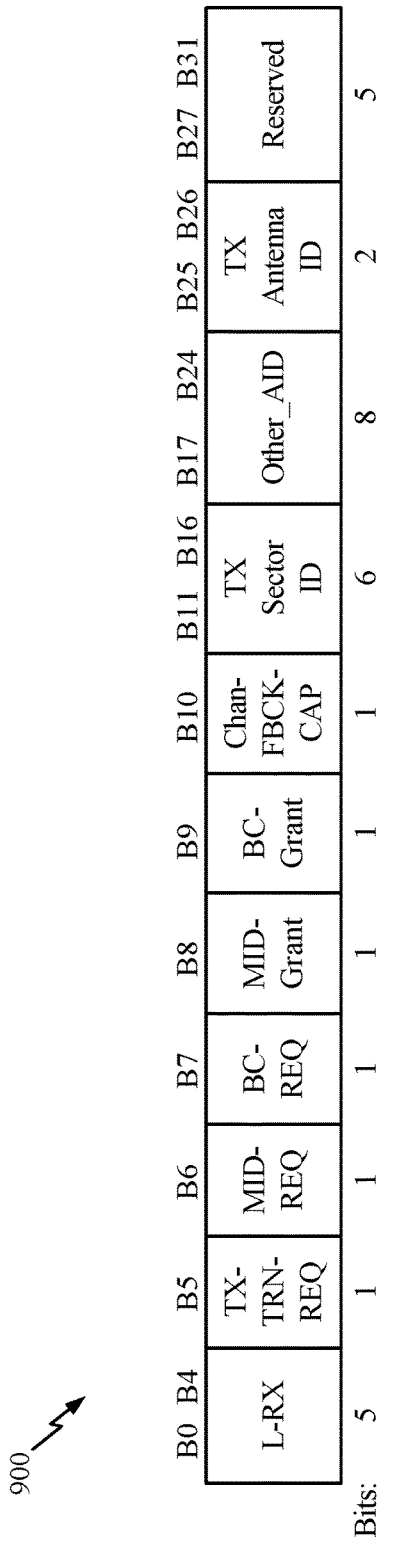

BEAMFORMING TRAINING USING MULTIPLE-INPUT AND MULTIPLE-OUTPUT TRANSMISSION SCHEME

CROSS-REFERENCE TO RELATED APPLICATIONS

This application claims benefit of priority to provisional application No. 62/278,653, filed Jan. 14, 2016 which is expressly incorporated herein by reference in its entirety.

BACKGROUND

Field of the Disclosure

Certain aspects of the present disclosure generally relate to wireless communications and, more particularly, to beamforming training using multiple-input and multiple-output (MIMO) transmission scheme.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple STAs to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to beamforming training using multiple-input and multiple-output (MIMO) transmission scheme.

Certain aspects of the present disclosure provide an apparatus for wireless communications. The apparatus generally includes a processing system configured to generate a frame associated with beamforming training, the frame comprising an indication of whether the beamforming training is to be performed using a multiple-input and multiple-output (MIMO) transmission scheme, and a first interface configured to output the frame for transmission.

Certain aspects of the present disclosure provide an apparatus for wireless communications. The apparatus generally includes a processing system configured to generate a sector sweep (SSW) frame for transmission during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and an interface configured to output for transmission the SSW frame.

Certain aspects of the present disclosure provide an apparatus for wireless communications. The apparatus generally includes a processing system configured to generate a frame associated with beamforming training, the frame comprising at least one sector sweep (SSW) field, and wherein the SSW field comprises an indication of a RF chain associated with a MIMO transmission scheme to be used during the beamforming training, and an interface configured to output the frame for transmission.

Certain aspects of the present disclosure provide an apparatus for wireless communications. The apparatus generally includes a first interface configured to obtain a frame associated with beamforming training, the frame comprising an indication of whether the beamforming training is to be performed using a multiple-input and multiple-output (MIMO) transmission scheme, and a processing system configured to perform the beamforming training based on the indication of whether the beamforming training is to be performed using the MIMO transmission scheme.

Certain aspects of the present disclosure provide an apparatus for wireless communications. The apparatus generally includes an interface configured to obtain a sector sweep (SSW) frame during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and a processing system configured to perform the beamforming training using the SSW frame.

Certain aspects of the present disclosure provide an apparatus for wireless communications. The apparatus generally includes an interface configured to obtain a frame associated with beamforming training, the frame comprising at least one sector sweep (SSW) field, and wherein the SSW field comprises an indication of a RF chain associated with a MIMO transmission scheme to be used during the beamforming training, and a processing system configured to perform the beamforming training based on the indication of the RF chain associated with the MIMO transmission scheme.

Certain aspects of the present disclosure provide a method for wireless communication. The method generally includes generating a frame associated with beamforming training, the frame comprising an indication of whether the beamforming training is to be performed using a multiple-input and multiple-output (MIMO) transmission scheme, and outputting the frame for transmission.

Certain aspects of the present disclosure provide a method for wireless communication. The method generally includes generating a sector sweep (SSW) frame for transmission during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and outputting for transmission the SSW frame.

Certain aspects of the present disclosure provide a method for wireless communication. The method generally includes generating a frame associated with beamforming training, the frame comprising at least one sector sweep (SSW) field, and wherein the SSW field comprises an indication of a RF chain associated with a MIMO transmission scheme to be used during the beamforming training, and outputting the frame for transmission.

Certain aspects of the present disclosure provide a method for wireless communication. The method generally includes obtaining a frame associated with beamforming training, the frame comprising an indication of whether the beamforming training is to be performed using a multiple-input and multiple-output (MIMO) transmission scheme, and performing the beamforming training based on the indication of whether the beamforming training is to be performed using the MIMO transmission scheme.

Certain aspects of the present disclosure provide a method for wireless communication. The method generally includes obtaining a sector sweep (SSW) frame during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and performing the beamforming training using the SSW frame.

Certain aspects of the present disclosure provide a method for wireless communication. The method generally includes obtaining a frame associated with beamforming training, the frame comprising at least one sector sweep (SSW) field, and wherein the SSW field comprises an indication of a RF chain associated with a MIMO transmission scheme to be used during the beamforming training, and performing the beamforming training based on the indication of the RF chain associated with the MIMO transmission scheme.

Certain aspects of the present disclosure provide an apparatus for wireless communication. The apparatus generally includes means for generating a frame associated with beamforming training, the frame comprising an indication of whether the beamforming training is to be performed using a multiple-input and multiple-output (MIMO) transmission scheme, and means for outputting the frame for transmission.

Certain aspects of the present disclosure provide an apparatus for wireless communication. The apparatus generally includes generating a sector sweep (SSW) frame for transmission during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and means for outputting for transmission the SSW frame.

Certain aspects of the present disclosure provide an apparatus for wireless communication. The apparatus generally includes means for generating a frame associated with beamforming training, the frame comprising at least one sector sweep (SSW) field, and wherein the SSW field comprises an indication of a RF chain associated with a MIMO transmission scheme to be used during the beamforming training, and means for outputting the frame for transmission.

Certain aspects of the present disclosure provide an apparatus for wireless communication. The apparatus generally includes means for obtaining a frame associated with beamforming training, the frame comprising an indication of whether the beamforming training is to be performed using a multiple-input and multiple-output (MIMO) transmission scheme, and means for performing the beamforming training based on the indication of whether the beamforming training is to be performed using the MIMO transmission scheme.

Certain aspects of the present disclosure provide an apparatus for wireless communication. The apparatus generally includes means for obtaining a sector sweep (SSW) frame during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and means for performing the beamforming training using the SSW frame.

Certain aspects of the present disclosure provide an apparatus for wireless communication. The apparatus generally includes means for obtaining a frame associated with beamforming training, the frame comprising at least one sector sweep (SSW) field, and wherein the SSW field comprises an indication of a RF chain associated with a MIMO transmission scheme to be used during the beamforming training, and means for performing the beamforming training based on the indication of the RF chain associated with the MIMO transmission scheme.

Certain aspects of the present disclosure provide a computer readable medium storing computer executable code for generating a frame associated with beamforming training, the frame comprising an indication of whether the beamforming training is to be performed using a multiple-input and multiple-output (MIMO) transmission scheme, and outputting the frame for transmission.

Certain aspects of the present disclosure provide a computer readable medium storing computer executable code for generating a sector sweep (SSW) frame for transmission during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and outputting for transmission the SSW frame.

Certain aspects of the present disclosure provide a computer readable medium storing computer executable code for generating a frame associated with beamforming training, the frame comprising at least one sector sweep (SSW) field, and wherein the SSW field comprises an indication of a RF chain associated with a MIMO transmission scheme to be used during the beamforming training, and outputting the frame for transmission.

Certain aspects of the present disclosure provide a computer readable medium storing computer executable code for obtaining a frame associated with beamforming training, the frame comprising an indication of whether the beamforming training is to be performed using a multiple-input and multiple-output (MIMO) transmission scheme, and performing the beamforming training based on the indication of whether the beamforming training is to be performed using the MIMO transmission scheme.

Certain aspects of the present disclosure provide a computer readable medium storing computer executable code for obtaining a sector sweep (SSW) frame during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and performing the beamforming training using the SSW frame.

Certain aspects of the present disclosure provide a computer readable medium storing computer executable code for obtaining a frame associated with beamforming training, the frame comprising at least one sector sweep (SSW) field, and wherein the SSW field comprises an indication of a RF chain associated with a MIMO transmission scheme to be used during the beamforming training, and performing the beamforming training based on the indication of the RF chain associated with the MIMO transmission scheme.

Certain aspects of the present disclosure provide a wireless node. The wireless node generally includes at least one antenna, and a processing system configured to generate a frame associated with beamforming training, the frame comprising an indication of whether the beamforming training is to be performed using a multiple-input and multiple-output (MIMO) transmission scheme, and output the frame for transmission via the at least one antenna.

Certain aspects of the present disclosure provide a wireless node. The wireless node generally includes at least one antenna, and a processing system configured to generate a sector sweep (SSW) frame for transmission during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and output for transmission the SSW frame via the at least one antenna.

Certain aspects of the present disclosure provide a wireless node. The wireless node generally includes at least one antenna, and a processing system configured to generate a frame associated with beamforming training, the frame comprising at least one sector sweep (SSW) field, and wherein the SSW field comprises an indication of a RF chain associated with a MIMO transmission scheme to be used during the beamforming training, and output the frame for transmission via the at least one antenna.

Certain aspects of the present disclosure provide a wireless node. The wireless node generally includes at least one antenna, and a processing system configured to obtain, via the at least one antenna, a frame associated with beamforming training, the frame comprising an indication of whether the beamforming training is to be performed using a multiple-input and multiple-output (MIMO) transmission scheme, and perform the beamforming training based on the indication of whether the beamforming training is to be performed using the MIMO transmission scheme.

Certain aspects of the present disclosure provide a wireless node. The wireless node generally includes at least one antenna, and a processing system configured to obtain, via the at least one antenna, a sector sweep (SSW) frame during at least one of a multiple sector ID capture (MIDC) phase of a beamforming training, a multiple sector ID (MID) phase of the beamforming training, a multiple sector ID and beam combining (BC) phase of the beamforming training, or a BC phase of the beamforming training, and perform the beamforming training using the SSW frame.

Certain aspects of the present disclosure provide a wireless node. The wireless node generally includes at least one antenna, and a processing system configured to obtain, via the at least one antenna, a frame associated with beamforming training, the frame comprising at least one sector sweep (SSW) field, and wherein the SSW field comprises an indication of a RF chain associated with a MIMO transmission scheme to be used during the beamforming training, and perform the beamforming training based on the indication of the RF chain associated with the MIMO transmission scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9A illustrates an example beam refinement protocol (BRP) request field format, in accordance with certain aspects of the present disclosure.

FIG. 9B illustrates an indication of whether MIMO transmission scheme is used for beamforming training and a corresponding number of streams, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
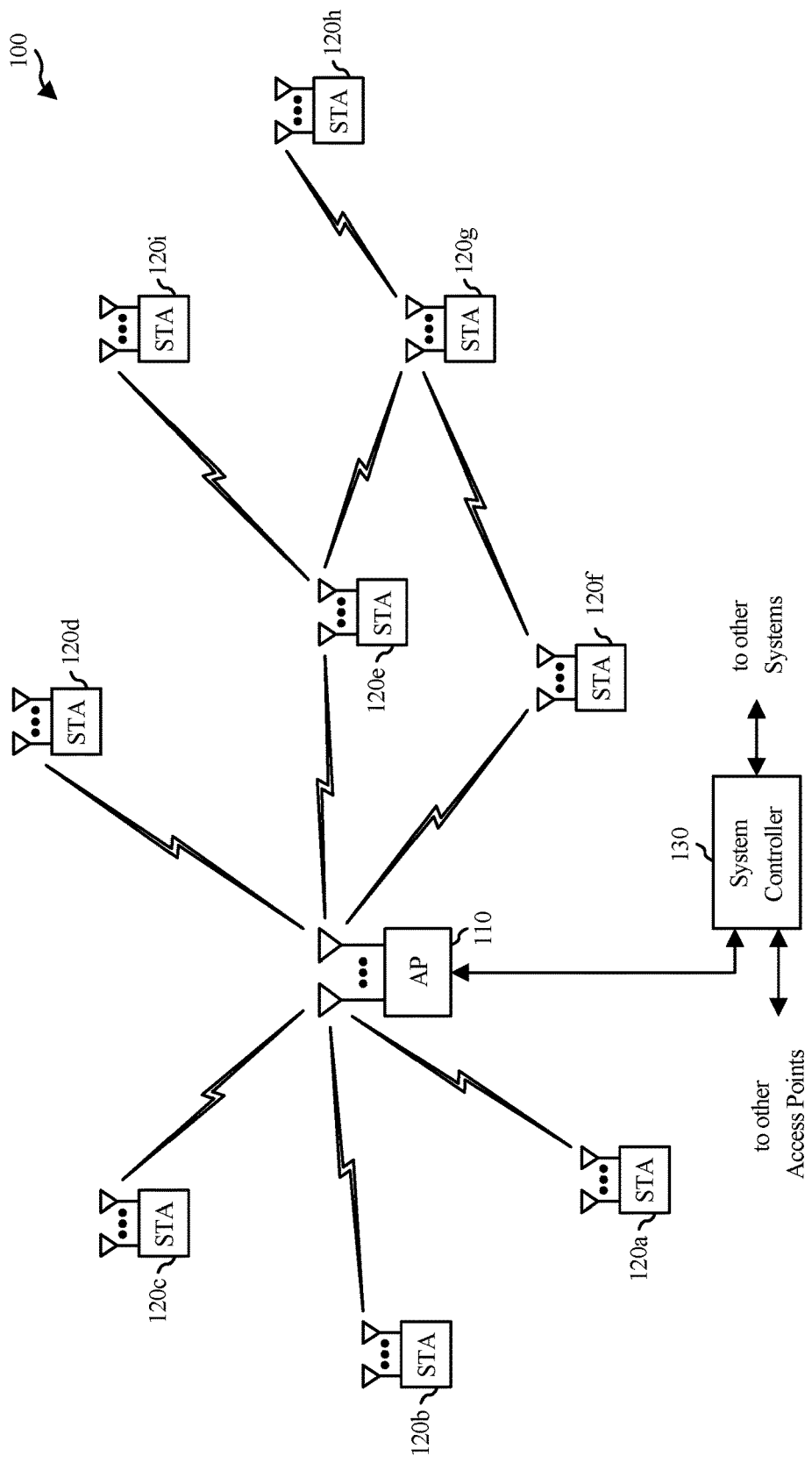
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to beamforming training using a multiple-input and multiple-output (MIMO) transmission scheme. For example, existing format of frames in accordance with IEEE 802.11ad may be adapted to facilitate beamforming using a MIMO transmission scheme.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple stations. A TDMA system may allow multiple stations to share the same frequency channel by dividing the transmission signal into different time slots, each time slot being assigned to different stations. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, an access point 120 may perform beamforming training to improve signal quality during communication with a station (STA) 120. The beamforming training may be performed using a MIMO transmission scheme.

The system 100 may be, for example, a multiple-access multiple-input multiple-output (MIMO) system 100 with access points and stations. For simplicity, only one access point 110 is shown in FIG. 1. An access point is generally a fixed station that communicates with the stations and may also be referred to as a base station or some other terminology. A STA may be fixed or mobile and may also be referred to as a mobile station, a wireless device, or some other terminology. Access point 110 may communicate with one or more STAs 120 at any given moment on the downlink and uplink. The downlink (i.e., forward link) is the communication link from the access point to the STAs, and the uplink (i.e., reverse link) is the communication link from the STAs to the access point. A STA may also communicate peer-to-peer with another STA.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe STAs 120 capable of communicating via Spatial Division Multiple Access (SDMA), for certain aspects, the STAs 120 may also include some STA that do not support SDMA. Thus, for such aspects, an AP 110 may be configured to communicate with both SDMA and non-SDMA STAs. This approach may conveniently allow older versions of STAs ("legacy" stations) to remain deployed in an enterprise, extending their useful lifetime, while allowing newer SDMA STAs to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected STAs 120 collectively represents the multiple-output for downlink transmissions and the multiple-input for uplink transmissions. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected STA transmits user-specific data to and/or receives user-specific data from the access point. In general, each selected STA may be equipped with one or multiple antennas (i.e., $N_{ut} \geq 1$). The K selected STAs can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, each time slot being assigned to different STA 120.

Figure 2:
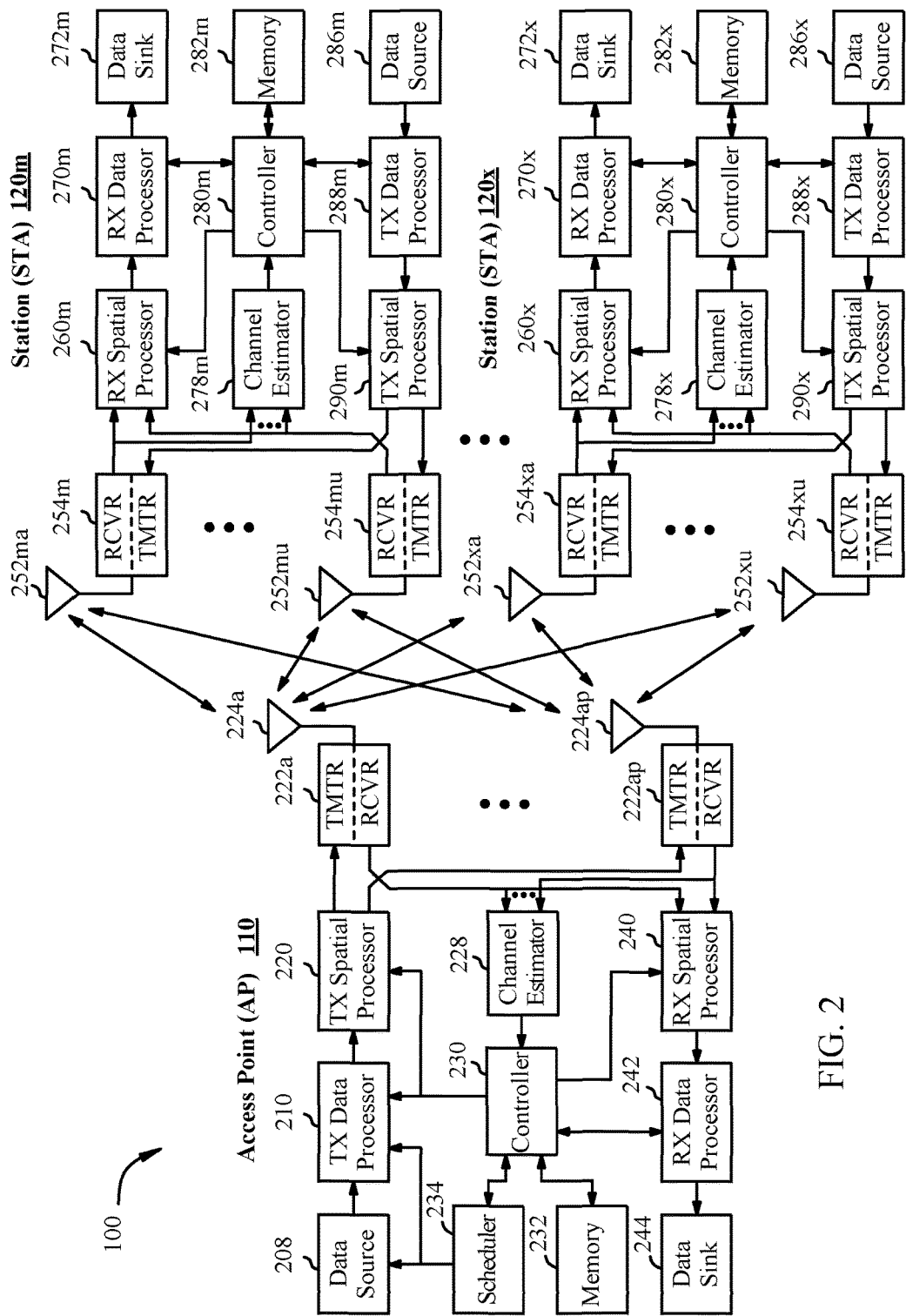
FIG. 2 is a block diagram of an example access point (AP) and STAs, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 or antenna 252, Tx/Rx 254, processors 260, 270, 288, and 290, and/or controller 280 may be used to perform the operations described herein and illustrated with reference to FIGS. 7 and 7A, FIGS. 8 and 8A, FIGS. 10 and 10A, FIGS. 11 and 11A, FIGS. 12 and 12A, and/or FIGS. 13 and 13A.

FIG. 2 illustrates a block diagram of access point 110 two STAs 120m and 120x in a MIMO system 100. The access point 110 is equipped with $N_t$ antennas 224a through 224ap. STA 120m is equipped with $N_{ut,m}$ antennas 252ma through 252mu, and STA 120x is equipped with $N_{ut,x}$ antennas 252xa through 252xu. The access point 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ STA are selected for simultaneous transmission on the uplink, $N_{dn}$ STAs are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and STA.

On the uplink, at each STA 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ STAs may be scheduled for simultaneous transmission on the uplink. Each of these STAs performs spatial processing on its data symbol stream and transmits its set of transmit symbol streams on the uplink to the access point.

At access point 110, $N_{ap}$ antennas 224a through 224ap receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STAs. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STAs. The decoded data for each STA may be provided to a data sink 272 for storage and/or a controller 280 for further processing.

At each STA 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each STA typically derives the spatial filter matrix for the STA based on the downlink channel response matrix $H_{dn,m}$ for that STA. Controller 230 derives the spatial filter matrix for the access point based on the effective uplink channel response matrix $H_{up,eff}$. Controller 280 for each STA may send feedback information (e.g., the downlink and/or uplink eigenvectors, eigenvalues, SNR estimates, and so on) to the access point. Controllers 230 and 280 also control the operation of various processing units at access point 110 and STA 120, respectively.

Figure 3:
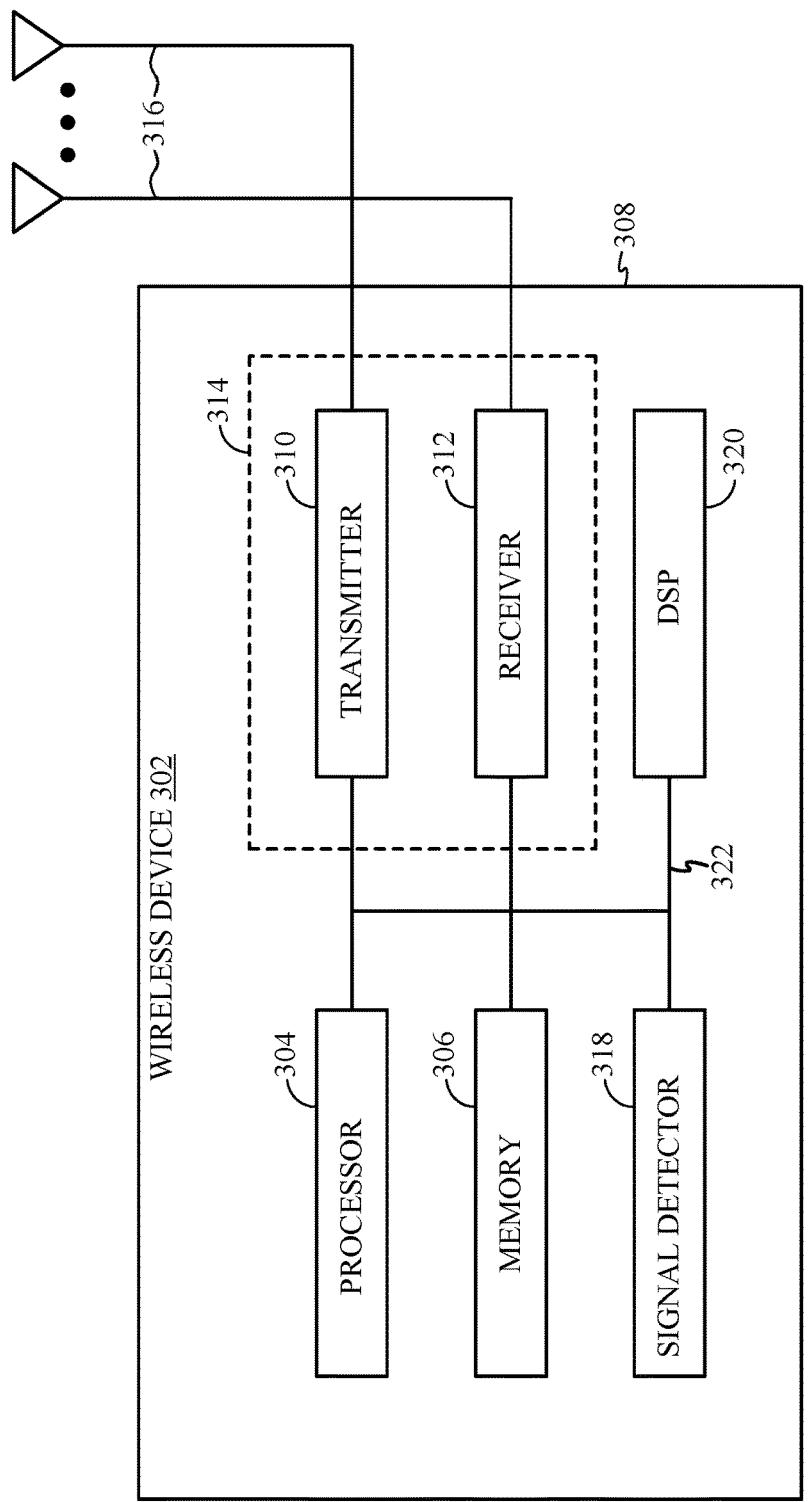
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 800 and 900 illustrated in FIGS. 8 and 9, respectively. The wireless device 302 may be an access point 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. In some cases, such as a half-duplex system (e.g., WLAN), the transmitter 310 and the receiver 312 may be combined. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Beamforming Training

Aspects of the present disclosure may be used to determine relative rotation of devices (e.g., APs and/or non-AP STAs) based on training signals. In some cases, the training signals may be transmitted as part of a beamforming (BF) training process according to, for example, the IEEE 802.11ad standard. Knowing the relative rotation may allow each device to optimize antenna settings for transmit and reception.

Figure 4:
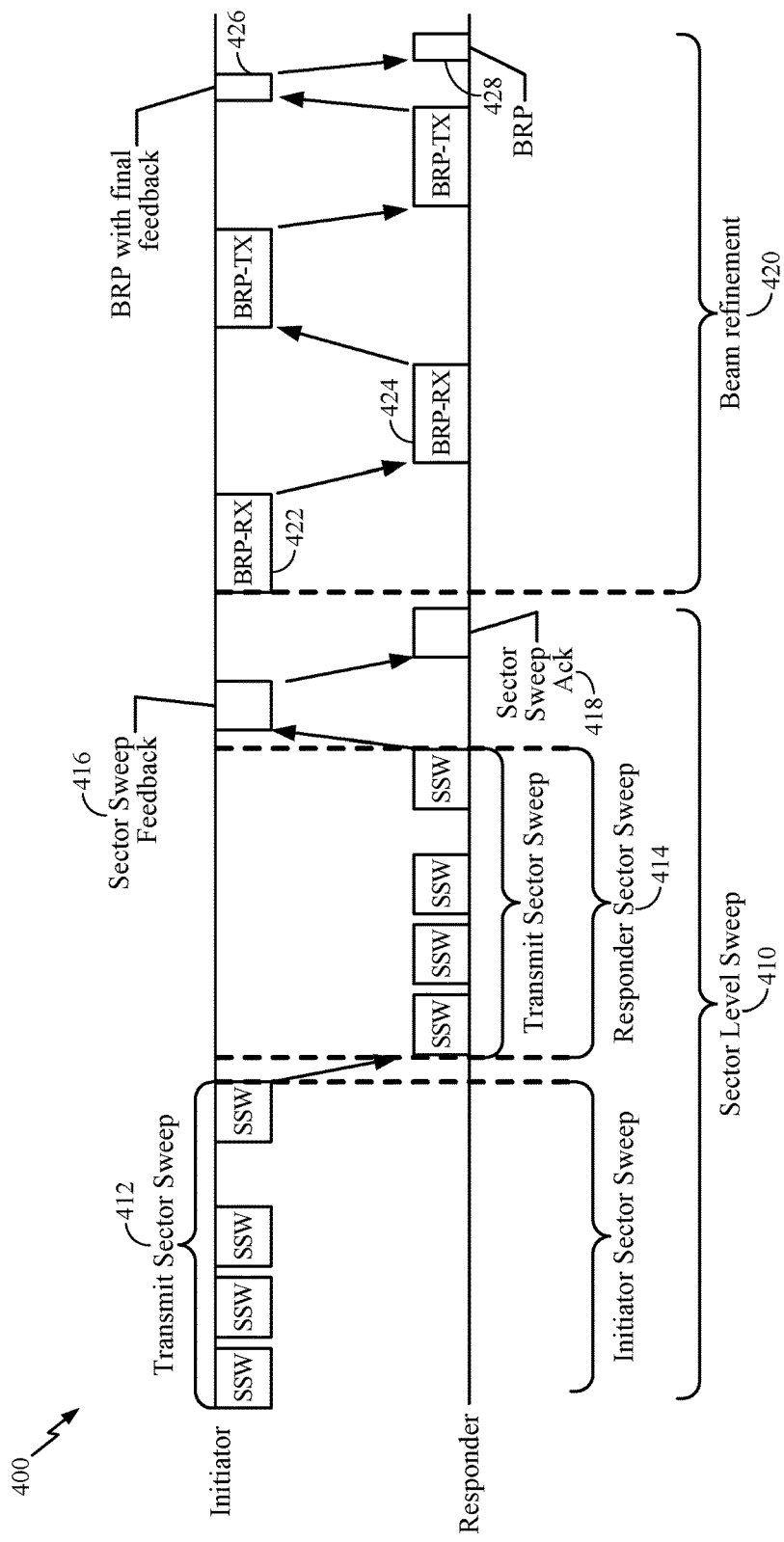
FIG. 4 is an example call flow illustrating a beam training phase, in accordance with certain aspects of the present disclosure.

An example BF training process is illustrated in FIG. 4. The BF process is typically employed by a pair of millimeter-wave stations, e.g., a receiver and transmitter. Each pairing of the stations achieves the necessary link budget for subsequent communication among those network devices. As such, BF training typically involves a bidirectional sequence of BF training frame transmissions that uses sector sweep and provides the necessary signals to allow each station to determine appropriate antenna system settings for both transmission and reception. After the successful completion of BF training, a (e.g., millimeter-wave) communication link may be established.

The beamforming process can help address one of the problems for communication at the millimeter-wave spectrum, which is its high path loss. As such, a large number of antennas are place at each transceiver to exploit the beamforming gain for extending communication range. That is, the same signal is sent from each antenna in an array, but at slightly different times.

As shown in the example BF training process 400 illustrated in FIG. 4, the BF process may include a sector level sweep (SLS) phase 410 and a subsequent beam refinement stage 420. In the SLS phase, one of the STAs acts as an initiator by conducting an initiator sector sweep 412, which is followed by a transmit sector sweep 414 by the responding station (where the responding station conducts a responder sector sweep). A sector generally refers to either a transmit antenna pattern or a receive antenna pattern corresponding to a particular sector ID. As mentioned above, a station may have a transceiver that includes one or more active antennas in an antenna array (e.g., a phased antenna array).

The SLS phase 410 typically concludes after an initiating station receives sector sweep feedback 416 and sends a sector acknowledgement (ACK) 418, thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

During the beam refinement phase 420, each station can sweep a sequence of transmissions (422 and 424), separated by a short beamforming interframe space (SBIFS) interval, in which the antenna configuration at the transmitter or receiver can be changed between transmissions, culminating in the exchange of final BRP feedback 426 and 428. In this manner, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Figure 5:
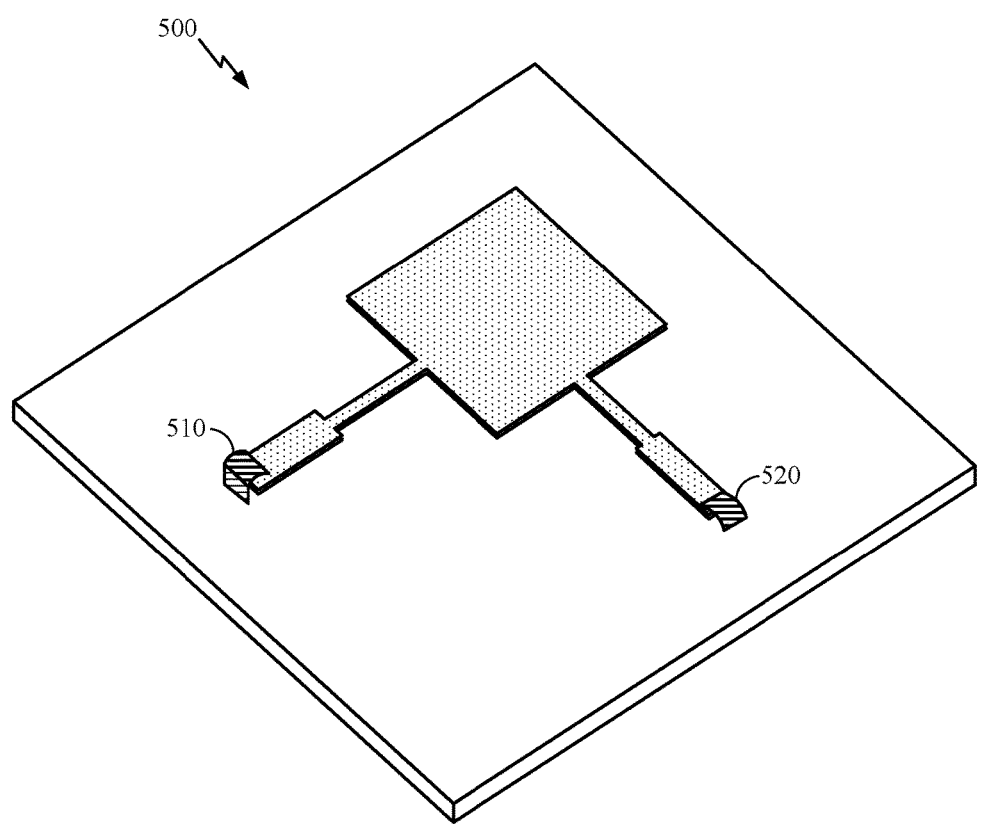
FIG. 5 illustrates an example dual polarized patch element, in accordance with certain aspects of the present disclosure.

FIG. 5 illustrates an example dual polarized patch element 500 which may be employed, in accordance with certain aspects of the present disclosure. As shown in FIG. 5, a single element of an antenna array may contain multiple polarized antennas. Multiple elements may be combined together to form an antenna array. The polarized antennas may be radially spaced. For example, as shown in FIG. 5, two polarized antennas may be arranged perpendicularly, corresponding to a horizontally polarized antenna 510 and a vertically polarized antenna 520. Alternatively, any number of polarized antennas may be used. Alternatively or in addition, one or both antennas of an element may also be circularly polarized.

Figure 6:
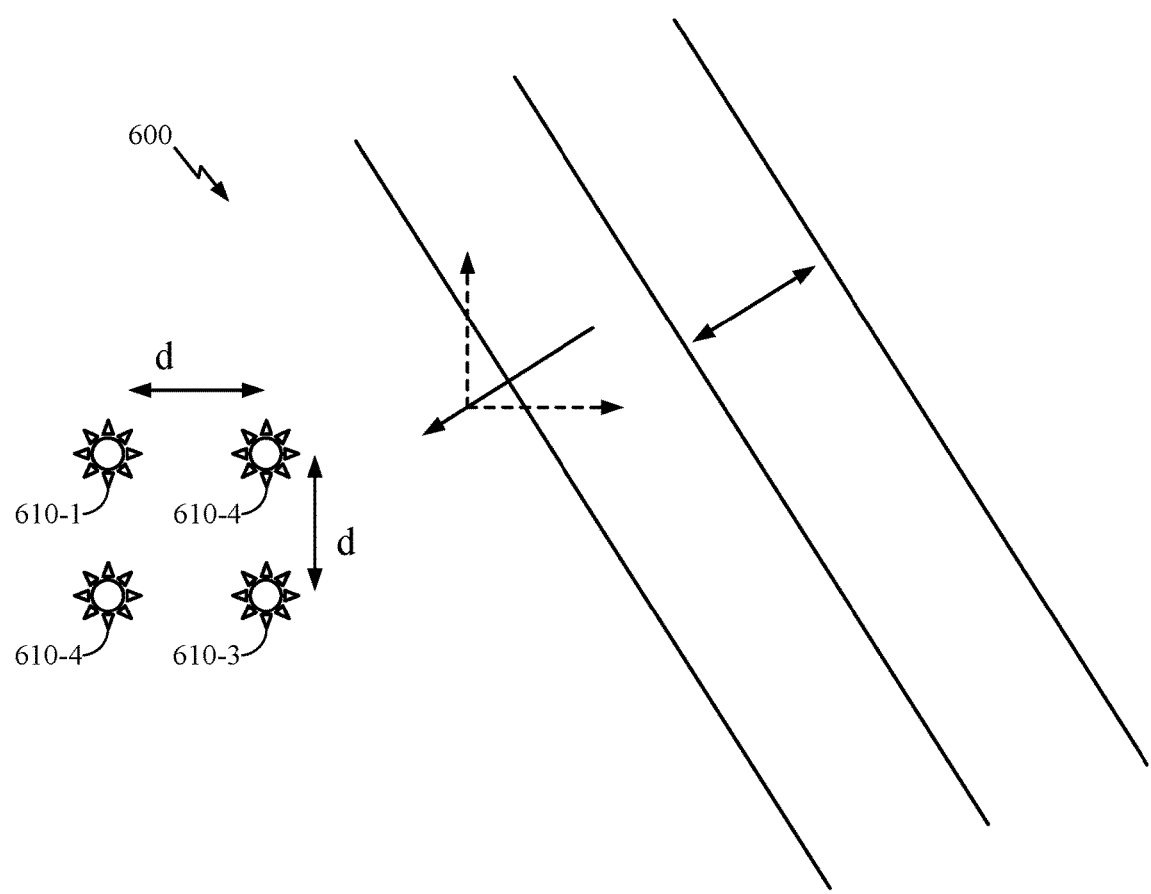
FIG. 6 is a diagram illustrating signal propagation in an implementation of phased-array antennas, in accordance with certain aspects of the present disclosure.

FIG. 6 is a diagram illustrating signal propagation 600 in an implementation of phased-array antennas. Phased array antennas use identical elements 610-1 through 610-4 (hereinafter referred to individually as an element 610 or collectively as elements 610). The direction in which the signal is propagated yields approximately identical gain for each element 610, while the phases of the elements 610 are different. Signals received by the elements are combined into a coherent beam with the correct gain in the desired direction. An additional consideration of the antenna design is the expected direction of the electrical field. In case the transmitter and/or receiver are rotated with respect to each other, the electrical field is also rotated in addition to the change in direction. This requires that a phased array be able to handle rotation of the electrical field by using antennas or antenna feeds that match a certain polarity and capable of adapting to other polarity or combined polarity in the event of polarity changes.

Information about signal polarity can be used to determine aspects of the transmitter of the signals. The power of a signal may be measured by different antennas that are polarized in different directions. The antennas may be arranged such that the antennas are polarized in orthogonal directions. For example, a first antenna may be arranged perpendicular to a second antenna where the first antenna represents a horizontal axis and the second antenna represents a vertical axis such that the first antenna is horizontally polarized and the second vertically polarized. Additional antennas may also be included, spaced at various angles in relation to each other. Once the receiver determines the polarity of the transmission the receiver may optimize performance by using the reception by matching the antenna to the received signal.

Example Beamforming Training Using a
Multiple-Input and Multiple-Output (MIMO)
Transmission Scheme The IEEE 802.11 ay standard may be developed in order to extend the throughput of the IEEE 802.11ad WLAN standard. Support of single-user (SU) MIMO and multi-user (MU) MIMO may be developed for the IEEE 802.11ay standard.

As part of the MIMO support, beamforming in mmWave (60 GHz band) may be supported in the IEEE 802.11ay standard. All MIMO cases may adapt the existing beamforming protocol as specified in existing 802.11ad standard. Existing beamforming techniques may be based on a beam-refinement protocol (BRP), sector-sweep (SSW) messages and corresponding fields such as a beamforming request field (e.g., BRP request field). However, these messages may not be adequate for MIMO beamforming. Therefore, there is a need for adaptations to the IEEE 802.11ad standard to allow for beamforming using a MIMO transmission scheme.

Aspects of the present disclosure provide a series of changes to fields, methods, flows and restrictions of the IEEE 802.11ad standard in order to adapt the existing IEEE 802.11ad standard to be used for IEEE 802.11ay (MIMO beamforming) in a way that allows existing fields in accordance with IEEE 802.11ad to be reused.

Figure 7:
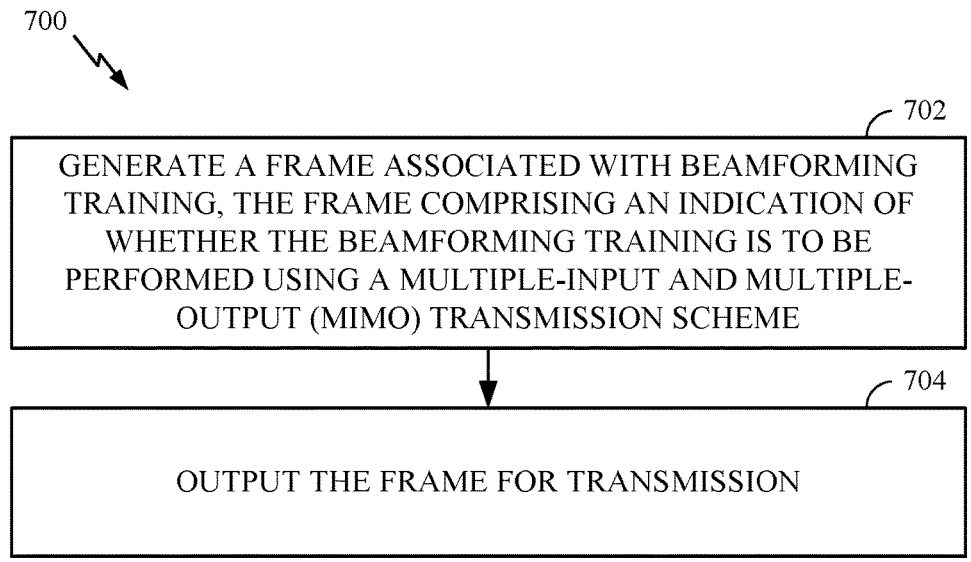
FIG. 7 is a flow diagram of example operation for providing an indication to perform beamforming training using a multiple-input and multiple-output (MIMO) transmission scheme, in accordance with certain aspects of the present disclosure.
Figure 7A:
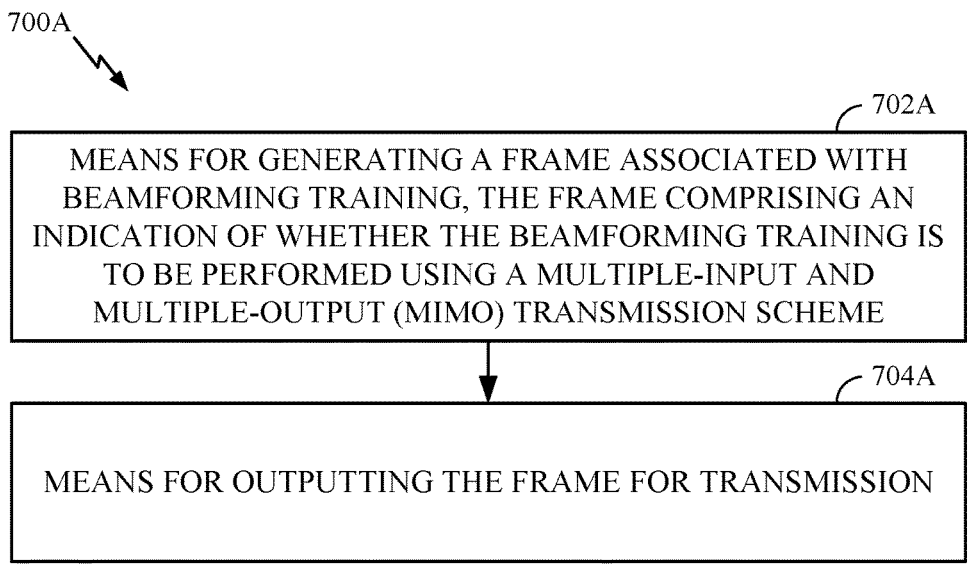
FIG. 7A illustrates example means capable of performing the operations shown in FIG. 7.

FIG. 7 is a flow diagram of example operations 700 for wireless communications, in accordance with certain aspects of the present disclosure. The operations 700 may be performed by an apparatus (e.g., a TX device), for example, by an access point (AP) or station (STA) (e.g., such as AP 110 or STA 120).

The operations 700 begin, at 702, by generating a frame associated with beamforming training, the frame comprising an indication of whether the beamforming training is to be performed using a MIMO transmission scheme. At 704, the apparatus may output the frame for transmission.

Figure 8:
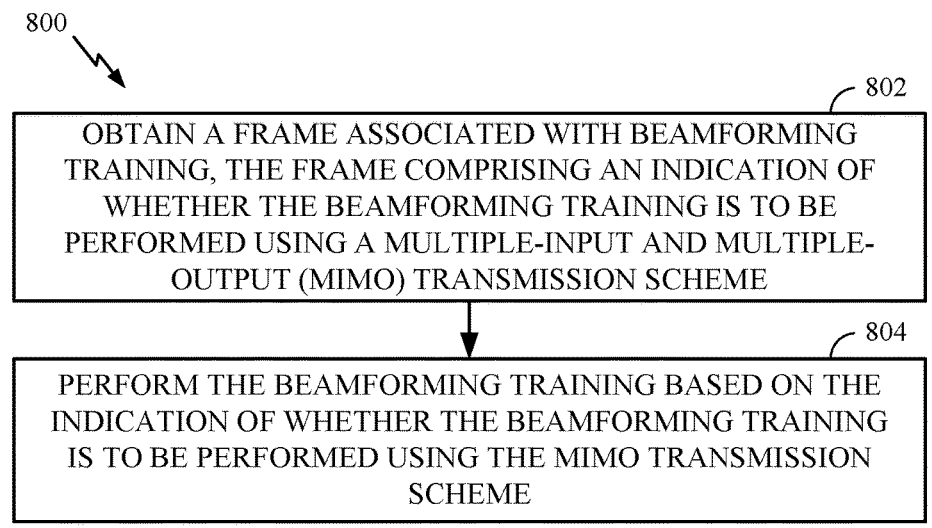
FIG. 8 is a flow diagram of example operation for receiving an indication to perform beamforming training using a MIMO transmission scheme, in accordance with certain aspects of the present disclosure.
Figure 8A:
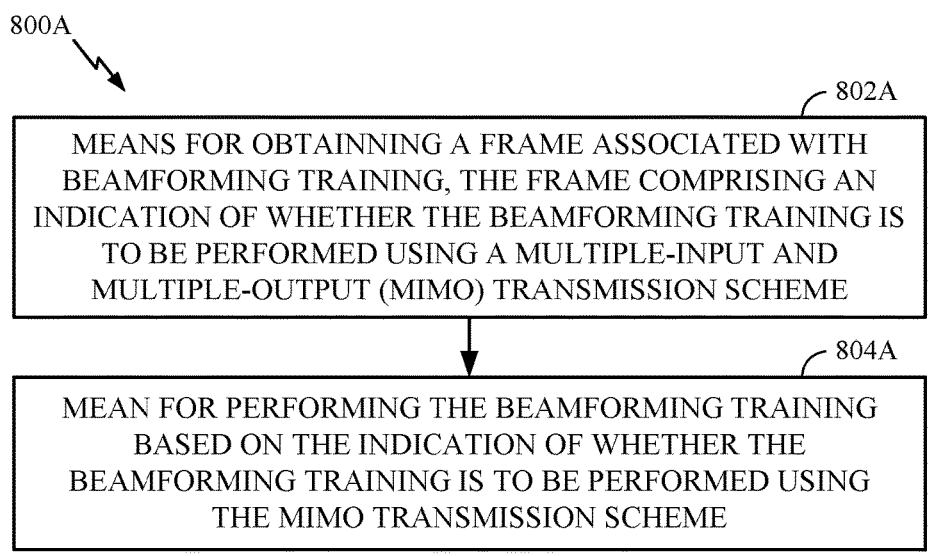
FIG. 8A illustrates example means capable of performing the operations shown in FIG. 8.

FIG. 8 is a flow diagram of example operations 800 for wireless communications, in accordance with certain aspects of the present disclosure. The operations 800 may be performed by an apparatus (e.g., an RX device), for example, by an access point (AP) or station (STA) (e.g., such as AP 110 or STA 120).

The operations 800 begin, at 802, by obtaining a frame associated with beamforming training, the frame comprising an indication of whether the beamforming training is to be performed using a multiple-input and multiple-output (MIMO) transmission scheme. At 804, the apparatus may perform the beamforming training based on the indication of whether the beamforming training is to be performed using the MIMO transmission scheme.

In certain aspects, the frame may include a beam refinement request field (e.g., BRP request field), which may include one or more bits to provide the indication of whether beamforming training is to be performed using the MIMO transmission scheme. In certain aspects, the one or more bits may also indicate a number of streams to be used for the MIMO transmission scheme.

FIG. 9A illustrates an example beamforming request field 900 format which may include the one or more bits used to indicate whether beamforming training is to be performed using a MIMO transmission scheme and/or a corresponding number of streams, in accordance with certain aspects of the present disclosure. As illustrated, the beamforming request field may include one or more reserved bits which may be used to provide such an indication.

FIG. 9B illustrates two bits used to indicate whether a MIMO transmission scheme is being used and a corresponding number of streams, in accordance with certain aspects of the present disclosure. In certain aspects, the two bits may correspond to the reserved bits of the beamforming request field such as bits 28 and 29. As illustrated, a value of "0" for both bits may indicate that a MIMO transmission scheme is not being used. A value of "01" may indicate that a 2×2 MIMO transmission scheme, a value of "10" may indicate that a 3×3 MIMO transmission scheme, and a value of "11" may indicate that a 4×4 MIMO transmission scheme.

The suggested bits in FIG. 9A may facilitate MIMO specific operations while reusing the existing field formats of the IEEE 802.11ad, existing frames and existing procedures. In certain aspects, the indication of whether a MIMO transmission scheme is used, and a corresponding number of streams, may be used during an optimization phase of beamforming training.

In certain aspects, the beamforming request field 900 may include one or more bits to provide an indication of whether the MIMO transmission scheme is single-user (SU) or multi-user (MU). For example, another bit of the beamforming request field 900 (e.g., reserved bit 27) may be reassigned to indicate whether MU-MIMO or SU-MIMO transmission scheme is being used for beamforming training. For example, when this bit is set, it indicates that the beamforming request field 900 is requesting beamforming training using a MU-MIMO transmissions scheme. When the bit cleared, it indicates that the beamforming request field 900 is requesting beamforming training using single-input and single-out (SISO) transmission scheme or SU-MIMO transmission scheme.

This additional bit may facilitate performing MU-MIMO specific operations while reusing the existing field formats, existing frames and existing procedures of the IEEE 802.11ad standard.

In the IEEE 802.11ad standard, a feedback type field ("FBCK-TYPE field") may be included in the frame associated with beamforming training. This feedback type field may be used to indicate a type of feedback expected in response to the transmission of the frame. Moreover, the feedback type field may include a number of measurements field ($N_{meas}$) which, in accordance with the IEEE standard 802.11ad, may indicate a number of measurements in a signal-to-noise ratio (SNR) subfield and a channel measurement subfield.

Beamforming training (e.g., BRP phase of beamforming training) may involve multiple phases, such as a multiple sector ID capture (MIDC) phase, multiple sector ID phase, a MID plus beam combining (BC) phase, and a BC phase. In certain aspects of the present disclosure, beamforming training frames (e.g., BRP frames) sent during the MID phase of beamforming training using a MIMO transmission scheme may set the value of the Nmeas field to be a sector countdown. For example, the sector countdown may be a counter configured to indicate a number of sectors remaining for transmission during the beamforming training.

In accordance with IEEE 802.11ad, the feedback type field may include a number of fields such as a SNR present field and a channel measurement present field. These fields may be used to indicate the presence of other subfields fields, such as a SNR subfield, as part of channel measurement feedback. In certain aspects of the present disclosure, in the BRP transmissions, there may be no measurements feedback elements, and thus, all these "present" fields may be set to 0.

In certain aspects, the Nmeas field may have the same behavior as a "CDOWN" field in a "Sector Sweep field" specified in the IEEE 802.11ad standard. The CDOWN field is a down-counter indicating the number of remaining directional DMG Beacon frame transmissions to the end of the TXSS, or the number of remaining SSW frame transmissions to the end of the TXSS and/or RXSS. This field may be set to 0 in the last frame DMG Beacon and SSW frame transmission.

By using the Nmeas field to indicate a sector countdown, the sector countdown may be indicated in the BRP frame which may not otherwise provide for such an indication and which may not have reserved bits that could be used for the indication of sector countdown. This allows for MIMO MID specific operations during beamforming training while reusing the existing field formats, existing frames and existing procedures of IEEE 802.11ad standard.

During beamforming training, multiple BRP frames may be transmitted. In accordance with IEEE 802.11ad, the BRP frames may be transmitted with a short interframe space (SIFS) between frames during a MID phase of the beamforming training. In certain aspects of the present disclosure, BRP frames may be transmitted using a short beamforming interframe space (SBIFS) between frames during a MID phase of the beamforming using MIMO transmission scheme. By transmitting BRP frames with SBIFS between frames, transmission time may be reduced, which saves power consumption for all devices involved and saves medium utilization.

Beamforming training in accordance with existing beamforming training protocols (e.g., IEEE 802.11ad) may specify for a grant message to be sent in response to a request message during MID phase and BC phase of the beamforming training. In certain aspects of the present disclosure, during the MID phase of beamforming training using MIMO transmission scheme, a BRP frame may be sent with a MID grant (e.g., MID grant field=1) and related information elements, and the MID grant may not be in response to a prior MID request. If an apparatus receiving the grant cannot comply, for example, because the grant that is not in response to a MID request, the receiving apparatus may send an error message. This change allows for a shortened protocol duration, saving time, power and medium utilization, while reuses exiting frame format (e.g., in accordance with IEEE 802.11ad) without any negative impact.

The existing protocol may specify for the transmitter of MID messages to use a list of sectors that are indicated by the receiver. For example, the IEEE 802.11ad indicates that in a receive MID phase of beamforming training, that a responder is to transmit one receive BRP packet, each from one of the chosen transmit sectors.

In certain aspects of the present disclosure, the MID transmitter may add and/or remove sectors from the sectors indicated by the receiver during a MID phase of beamforming training using a MIMO transmission scheme. That is, the MID transmitter may add and/or remove sectors according to an algorithm to improve the MIMO beamforming. For example, by allowing a transmitter to add and/or remove sectors during MIMO beamforming, the transmitter may be able to perform beamforming with multiple receivers. The transmitter may obtain an indication of at least one sector by a first receiver, and at least one sector by a second receiver. The transmitter may use both the first and second sectors, for example, as indicated by the first and second receivers, to perform beamforming training such that the transmitter can train both the first and second receivers together.

This change allows for reduced transmission time, which directly saves power consumption for all devices involved and saves medium utilization, while reusing existing frame format. This technique also avoids sector-level sweep (SLS) using all available sectors, while allowing the use of these sectors to improve MIMO beamforming.

When performing beamforming training, for example, using MU-MIMO transmission scheme, with multiple receivers (e.g., STAs), more than one STA may receive and perform MID receive activities. Therefore, more than one STA may be receiving BRP frames and transmitting feedback for the BRP frame. Therefore, the BRP feedback from each of the multiple receivers may collide and cause interference to each other.

Certain aspects of the present disclosure may prevent each receiver from transmitting a BRP feedback automatically after receiving a BRP frame. Rather, each receiver may send feedback corresponding to a BRP frame in accordance with a multi-user sequence. For example, each receiver may be configured to transmit feedback upon receiving an indication, such as a feedback request, or after waiting a predetermined time period (e.g., a time-out period) such that the BRP feedback transmissions from each receiver do not collide. The timeout period may be used for handling error cases and avoiding a dead-lock situation. This change allows for reuse of the existing BRP frames for the MID phase of beamforming training using a MU-MIMO transmission scheme, while avoiding the response (feedback message) collision.

A sector-level sweep (SLS) phase of beamforming training may involve TXSS using SSW frames in a beacon transmission interval (BTI) and a data transfer interval (DTI). In the IEEE 802.11-REVmc/D4.3, it was indicated that a frame transmitted as part of a sector sweep does not include training (TRN) fields.

Certain aspects of the present disclosure provide that SSW frames may be used during beamforming using a MIMO transmission scheme, in at least one of the phases MIDC, MID, MID+BC and BC.

Figure 10:
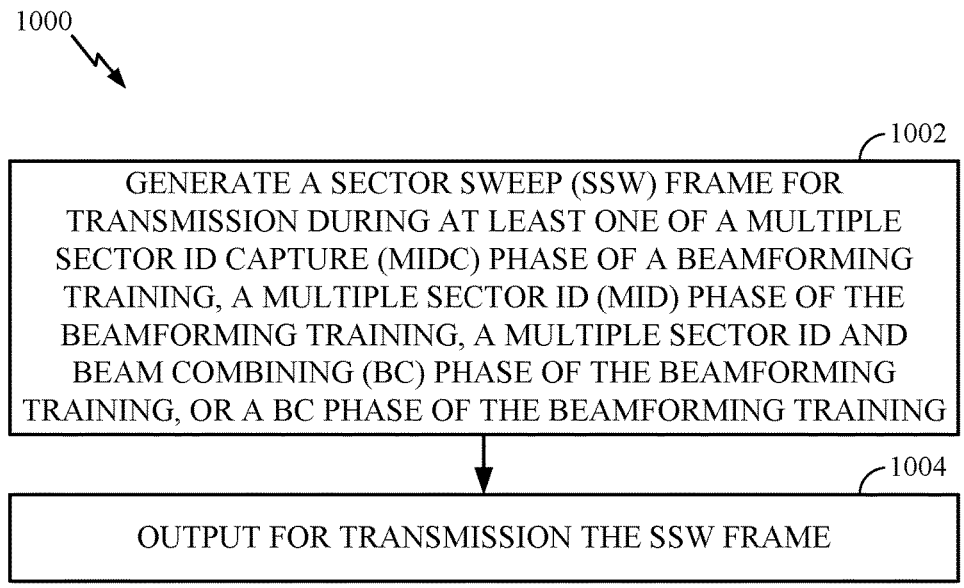
FIG. 10 is a flow diagram of example operation for outputting for transmission a sector sweep (SSW) frame, in accordance with certain aspects of the present disclosure.
Figure 10A:
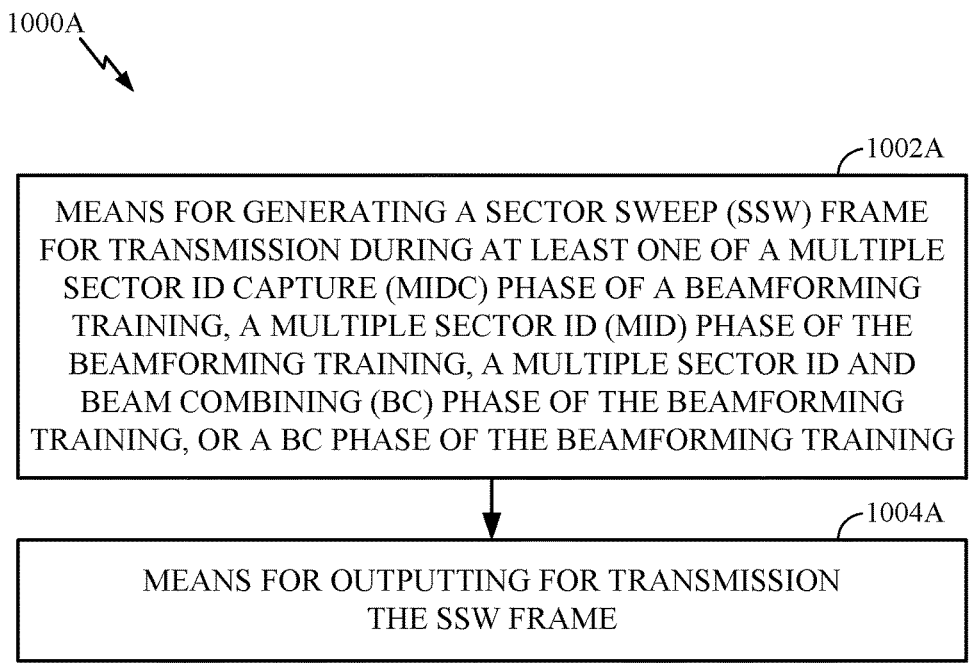
FIG. 10A illustrates example means capable of performing the operations shown in FIG. 10.

FIG. 10 is a flow diagram of example operations 1000 for wireless communications, in accordance with certain aspects of the present disclosure. The operations 1000 may be performed by an apparatus (e.g., TX device), for example, by an access point (AP) or station (STA) (e.g., such as AP 110 or STA 120).

The operations 1000 begin, at 1002, by generating a sector sweep (SSW) frame for transmission during at least one of a MIDC phase of a beamforming training, a MID phase of the beamforming training, a MID and BC phase of the beamforming training, or a BC phase of the beamforming training. At 804, the apparatus may output for transmission the SSW frame.

Figure 11:
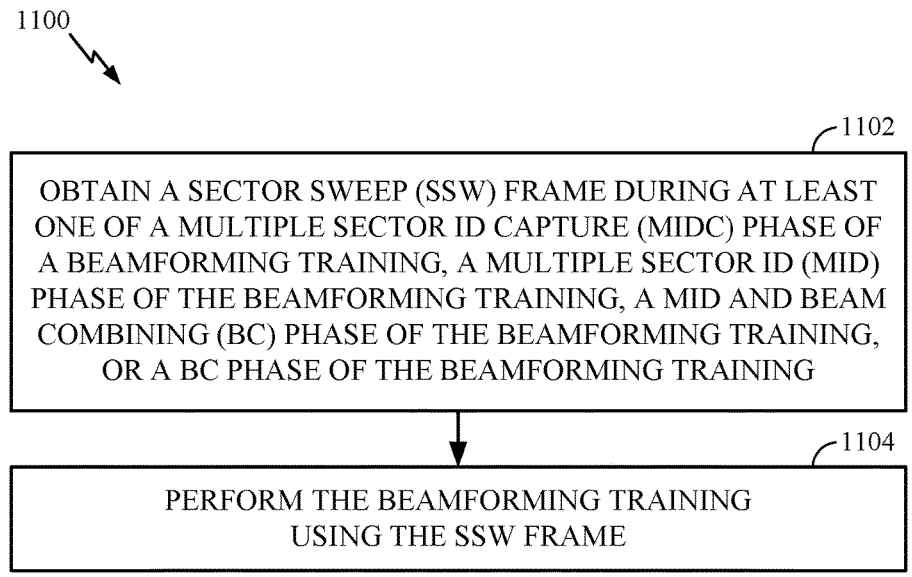
FIG. 11 is a flow diagram of example operation for obtaining a SSW frame, in accordance with certain aspects of the present disclosure.
Figure 11A:
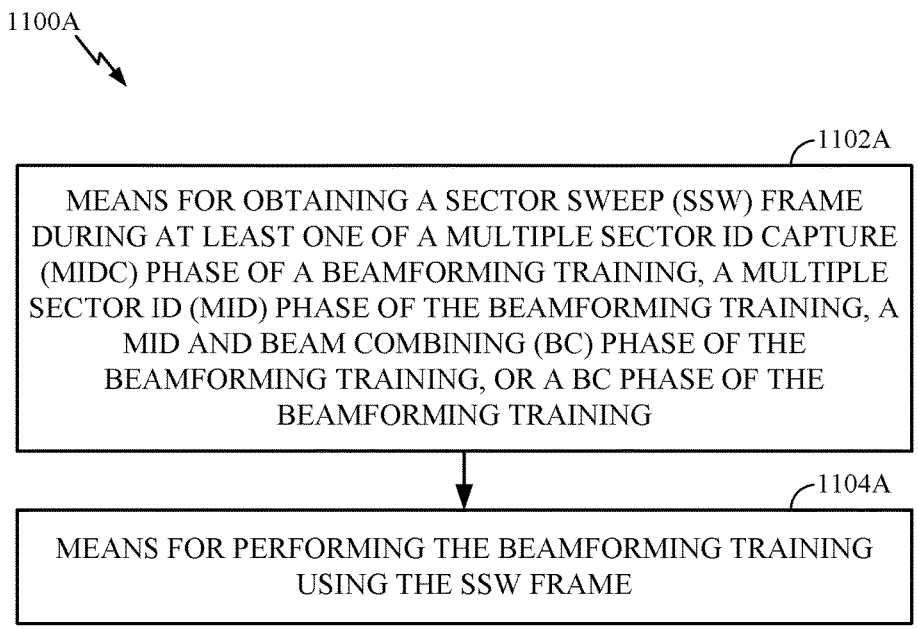
FIG. 11A illustrates example means capable of performing the operations shown in FIG. 11.

FIG. 11 is a flow diagram of example operations 1100 for wireless communications, in accordance with certain aspects of the present disclosure. The operations 1100 may be performed by an apparatus (e.g., an RX device), for example, by an access point (AP) or station (STA) (e.g., such as AP 110 or STA 120).

The operations 1100 begin, at 1102, by obtaining a sector sweep (SSW) frame during at least one of a MIDC phase of a beamforming training, a MID phase of the beamforming training, a MID and BC phase of the beamforming training, or a BC phase of the beamforming training. At 804, the apparatus may perform the beamforming training using the SSW frame.

In certain aspects, the SSW frames may include TRN fields during the beamforming training using a MIMO transmission scheme, in at least one of the phases MIDC, MID, MID+BC and BC. By allowing SSW frames to include TRN fields during MIDC, MID, MID+BC and BC phases of beamforming training, transmission time may be reduced, which saves power consumption for all devices involved and saves medium utilization, while reusing existing frame format of IEEE 802.11ad.

SSW and BRP fields in accordance with IEEE 802.11ad may include an antenna ID, which may also be referred to as "DMG Antenna ID". The antenna ID may indicate the DMG antenna the transmitter is currently using for transmission. In certain aspects of the present disclosure, the antenna ID field of SSW and BRP fields may be reassigned to indicate an RF chain, when using a MIMO transmission scheme for beamforming training. The RF chain ID may be an index that specifies the RF chain associated with the MIMO transmit or receive processing chain. A STA supporting MIMO may be able to transmit/receive independent spatial streams via each of the RF chains it has. This change allows signaling of the RF chain ID field, that may be important to beamforming using a MIMO transmission scheme by using existing fields in accordance with IEEE 802.11ad.

Figure 12:
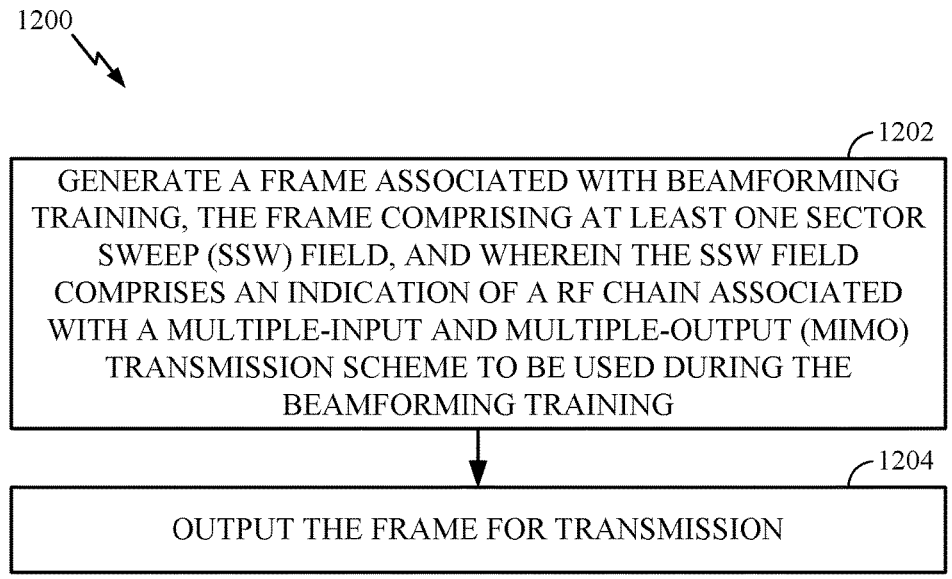
FIG. 12 is a flow diagram of example operation for providing an indication of an RF chain, in accordance with certain aspects of the present disclosure.
Figure 12A:
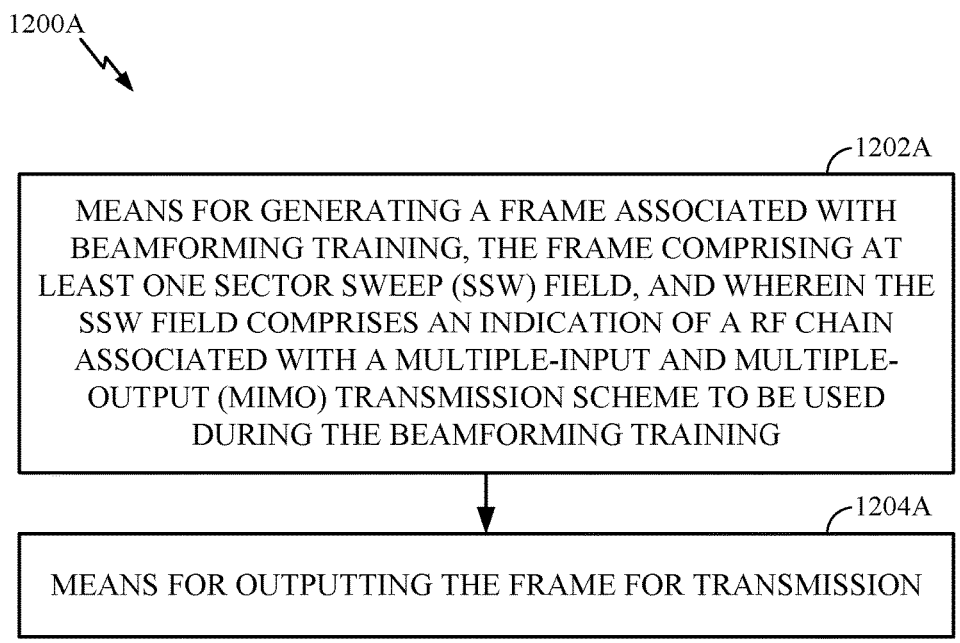
FIG. 12A illustrates example means capable of performing the operations shown in FIG. 12.

FIG. 12 is a flow diagram of example operations 1200 for wireless communications, in accordance with certain aspects of the present disclosure. The operations 1200 may be performed by an apparatus (e.g., TX device), for example, by an access point (AP) or station (STA) (e.g., such as AP 110 or STA 120).

The operations 1200 begin, at 1202, by generating a frame associated with beamforming training, the frame comprising at least one sector sweep (SSW) field, and wherein the SSW field comprises an indication of a RF chain associated with a MIMO transmission scheme to be used during the beamforming training. At 804, the apparatus may output the frame for transmission.

Figure 13:
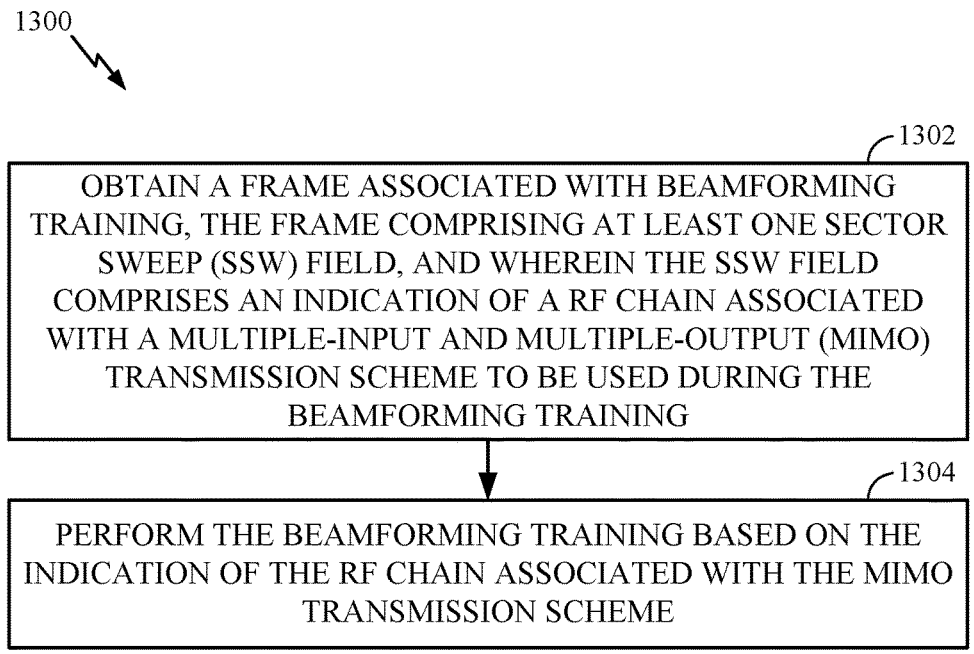
FIG. 13 is a flow diagram of example operation for obtaining an indication of an RF chain, in accordance with certain aspects of the present disclosure.
Figure 13A:
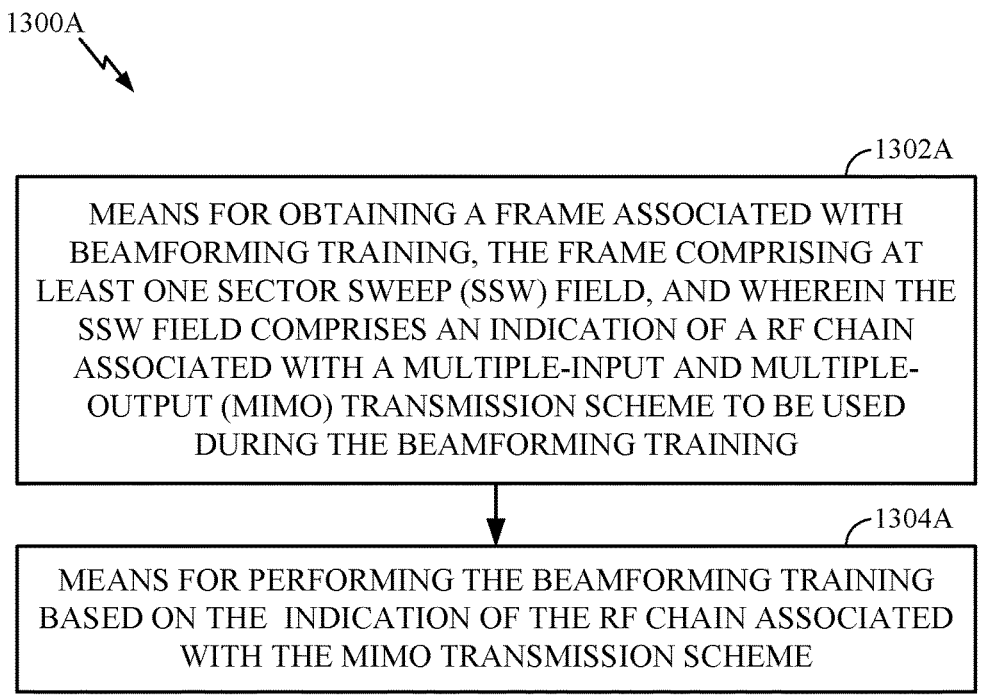
FIG. 13A illustrates example means capable of performing the operations shown in FIG. 13.

FIG. 13 is a flow diagram of example operations 1300 for wireless communications, in accordance with certain aspects of the present disclosure. The operations 1300 may be performed by an apparatus (e.g., RX device), for example, by an access point (AP) or station (STA) (e.g., such as AP 110 or STA 120).

The operations 1300 begin, at 1302, by obtaining a frame associated with beamforming training, the frame comprising at least one sector sweep (SSW) field, and wherein the SSW field comprises an indication of a RF chain associated with a MIMO transmission scheme to be used during the beamforming training. At 1304, the apparatus may perform the beamforming training based on the indication of the RF chain associated with the MIMO transmission scheme.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7, operations 800 illustrated in FIG. 8, operations 1000 in FIG. 10, operations 1100 in FIG. 11, operations 1200 in FIG. 12, and operations 1300 in FIG. 13 correspond to means 700A illustrated in FIG. 7A, means 800A illustrated in FIG. 8A, means 1000A illustrated in FIG. 10A, means 1100A illustrated in FIG. 11A, means 1200A illustrated in FIG. 12A, and means 1300A illustrated in FIG. 13A, respectively.

For example, means for receiving and means for obtaining may be a receiver (e.g., the receiver unit of transceiver 254) and/or an antenna(s) 252 of the STA 120 illustrated in FIG. 2 or the receiver (e.g., the receiver unit of transceiver 222) and/or antenna(s) 224 of access point 110 illustrated in FIG. 2. Means for transmitting may be a transmitter (e.g., the transmitter unit of transceiver 254) and/or an antenna(s) 252 of the STA 120 illustrated in FIG. 2 or the transmitter (e.g., the transmitter unit of transceiver 222) and/or antenna(s) 224 of access point 110 illustrated in FIG. 2. Means for outputting may also be a transmitter or may be a bus interface, for example, to output a frame from a processor to an RF front end for transmission.

Means for estimating, means for performing, means for generating, means for including, means for determining, and means for providing may comprise a processing system, which may include one or more processors, such as the RX data processor 270, the TX data processor 288, and/or the controller 280 of the STA 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above for providing an immediate response indication in a PHY header. For example, an algorithm for outputting a first frame for transmission to another apparatus at a first time, an algorithm for obtaining, at a second time, a second frame transmitted by the other apparatus in response to the first frame, and an algorithm for generating a third frame for transmission to the other apparatus via the transmit interface, the third frame including information indicating a difference between the first time and the second time and an indication of at least one of an angle of departure of the first frame or an angle of arrival of the second frame. In another example, an algorithm for outputting a second frame for transmission to another apparatus in response to a first frame received from the other apparatus, an algorithm for obtaining a third frame transmitted by the other apparatus in response to the second frame, the third frame including information indicating a difference between the first time and the second time and an indication of at least one of an angle of departure of the first frame or an angle of arrival of the second frame, and an algorithm for estimating a location of the apparatus relative to the other apparatus based, at least in part, on the difference between the first time and the second time and at least one of the angle of departure of the first frame or the angle of arrival of the second frame.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a STA 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for outputting a first frame for transmission to another apparatus at a first time, instructions for obtaining, at a second time, a second frame transmitted by the other apparatus in response to the first frame, and instructions for generating a third frame for transmission to the other apparatus via the transmit interface, the third frame including information indicating a difference between the first time and the second time and an indication of at least one of an angle of departure of the first frame or an angle of arrival of the second frame. In another example, instructions for outputting a second frame for transmission to another apparatus in response to a first frame received from the other apparatus, instructions for obtaining a third frame transmitted by the other apparatus in response to the second frame, the third frame including information indicating a difference between the first time and the second time and an indication of at least one of an angle of departure of the first frame or an angle of arrival of the second frame, and instructions for estimating a location of the apparatus relative to the other apparatus based, at least in part, on the difference between the first time and the second time and at least one of the angle of departure of the first frame or the angle of arrival of the second frame.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
one or more processors configured to generate a frame associated with beamforming training, the frame comprising an indication of whether the beamforming training is to be performed using a multiple-input and multiple-output (MIMO) transmission scheme, wherein the frame comprises a beam refinement request field, the beam refinement request field comprising one or more bits, wherein the one or more bits provide the indication of whether the beamforming training is to be performed using the MIMO transmission scheme, and wherein the beam refinement request field comprises one or more other bits providing an indication of whether the MIMO transmission scheme is single-user (SU) or multi-user (MU);
a first interface configured to output the frame for transmission; and
a second interface configured to obtain an indication of at least one first sector to be used for performing a multiple sector identifier (MID) phase of the beamforming training, wherein the one or more processors are configured to perform the MID phase of the beamforming training using at least one second sector and in accordance with the indication of whether the beamforming training is to be performed using the MIMO transmission scheme, wherein the first interface is configured to output for transmission a feedback request during the MID phase of the beamforming training, and wherein:
a number of sectors of the at least one first sector is different than a number of sectors of the at least one second sector; or
the at least one second sector comprises one or more sectors that are not in the at least one first sector.

2. The apparatus of claim 1, wherein the one or more bits also indicate a number of streams to be used for the MIMO transmission scheme.

3. The apparatus of claim 1, wherein:
the second interface is configured to obtain feedback associated with the frame in response to the feedback request if the one or more other bits indicate that the MIMO transmission scheme is MU.

4. The apparatus of claim 1, wherein:
the frame comprises a feedback type field indicating a type of feedback expected by the apparatus in response to the frame; and
the feedback type field comprises a counter configured to indicate a number of sectors remaining for use by the apparatus for the beamforming training.

5. The apparatus of claim 1, wherein the frame further comprises an indication of a radio frequency (RF) chain associated with the MIMO transmission scheme.

6. The apparatus of claim 5, wherein the frame comprises a beam refinement protocol (BRP) field that includes the indication of the RF chain.

7. The apparatus of claim 1, wherein the one or more processors is configured to generate a plurality of frames, during the beamforming training, for transmission in accordance with a short beamforming interframe space (SBIFS) between frames, wherein the SBIFS between frames is used during the MID phase of the beamforming training.

8. The apparatus of claim 1, wherein the frame comprises a MID grant field being generated independent of reception of a MID request.

9. The apparatus of claim 1, wherein:
a first value of the one or more bits indicates that the beamforming training is to be performed without using the MIMO transmission scheme; and
a second value of the one or more bits indicates that the beamforming training is to be performed using the MIMO transmission scheme.

10. The apparatus of claim 9, wherein the second value of the one or more bits also indicates a number of streams to be used for the MIMO transmission scheme.

11. An apparatus for wireless communication, comprising:
a first interface configured to obtain a frame associated with beamforming training, the frame comprising an indication of whether the beamforming training is to be performed using a multiple-input and multiple-output (MIMO) transmission scheme, wherein the frame comprises a beam refinement request field, the beam refinement request field comprising one or more bits, wherein the one or more bits provide the indication of whether the beamforming training is to be performed using the MIMO transmission scheme, and wherein the beam refinement request field comprises one or more other bits providing an indication of whether the MIMO transmission scheme is single-user (SU) or multi-user (MU);
a second interface configured to output an indication of at least one first sector to be used for performing a multiple sector identifier (MID) phase of the beamforming training; and
one or more processors configured to perform the MID phase of the beamforming training using at least one second sector based on the indication of whether the beamforming training is to be performed using the MIMO transmission scheme, wherein the one or more processors is further configured to perform the beamforming training based on the indication of whether the MIMO transmission scheme is SU or MU, wherein the first interface is configured to obtain a feedback request during the MID phase of the beamforming training, and wherein:
a number of sectors of the at least one first sector is different than a number of sectors of the at least one second sector; or
the at least one second sector comprises one or more sectors that are not in the at least one first sector.

12. The apparatus of claim 11, wherein:
the one or more bits also indicate a number of streams to be used for the MIMO transmission scheme; and the one or more processors is configured to perform the beamforming training based on the indicated number of streams.

13. The apparatus of claim 11, wherein:
the second interface is configured to output feedback associated with the frame in response to the feedback request if the one or more other bits indicate that the MIMO transmission scheme is MU.

14. The apparatus of claim 11, wherein the second interface is configured to output feedback associated with the frame after a time period if the one or more other bits indicate that the MIMO transmission scheme is MU, wherein the time period is determined based on a MU transmission sequence.

15. The apparatus of claim 11, wherein:
the frame comprises a feedback type field indicating a type of feedback to be sent in response to the frame; and
the feedback type field comprises a counter configured to indicate a number of sectors remaining for use by the apparatus for the beamforming training.

16. The apparatus of claim 11, wherein:
the frame further comprises an indication of a radio frequency (RF) chain associated with the MIMO transmission scheme; and
the one or more processors is configured to perform beamforming training based on the indication of the RF chain associated with the MIMO transmission scheme.

17. The apparatus of claim 11, wherein the first interface is configured to obtain a plurality of frames, during the beamforming training, in accordance with a short beamforming interframe space (SBIFS) between frames, wherein the SBIFS between frames is used during the MID phase of the beamforming training.

18. The apparatus of claim 11, wherein the frame comprises a MID grant field being generated independent of reception of a MID request.

19. The apparatus of claim 11, further comprising at least one antenna, wherein the first interface is configured to obtain the frame via the at least one antenna, and wherein the apparatus is configured as a wireless node.

20. A wireless node, comprising:
at least one antenna;
one or more processors configured to:
generate a frame associated with beamforming training, the frame comprising an indication of whether the beamforming training is to be performed using a multiple-input and multiple-output (MIMO) transmission scheme, wherein the frame comprises a beam refinement request field, the beam refinement request field comprising one or more bits, wherein the one or more bits provide the indication of whether the beamforming training is to be performed using the MIMO transmission scheme, and wherein the beam refinement request field comprises one or more other bits providing an indication of whether the MIMO transmission scheme is single-user (SU) or multi-user (MU);
a first interface configured to output the frame for transmission via the at least one antenna; and
a second interface configured to obtain, via the at least one antenna, an indication of at least one first sector to be used for performing a multiple sector identifier (MID) phase of the beamforming training, wherein the one or more processors are configured to perform the MID phase of the beamforming training using at least one second sector and in accordance with the indication of whether the beamforming training is to be performed using the MIMO transmission scheme, wherein the first interface is configured to output for transmission a feedback request during the MID phase of the beamforming training, and wherein:
a number of sectors of the at least one first sector is different than a number of sectors of the at least one second sector; or
the at least one second sector comprises one or more sectors that are not in the at least one first sector.

* * * * *